Dec. 8, 1970   J. T. CALHOUN   3,545,309
MULTIPLE DRILL PRESS

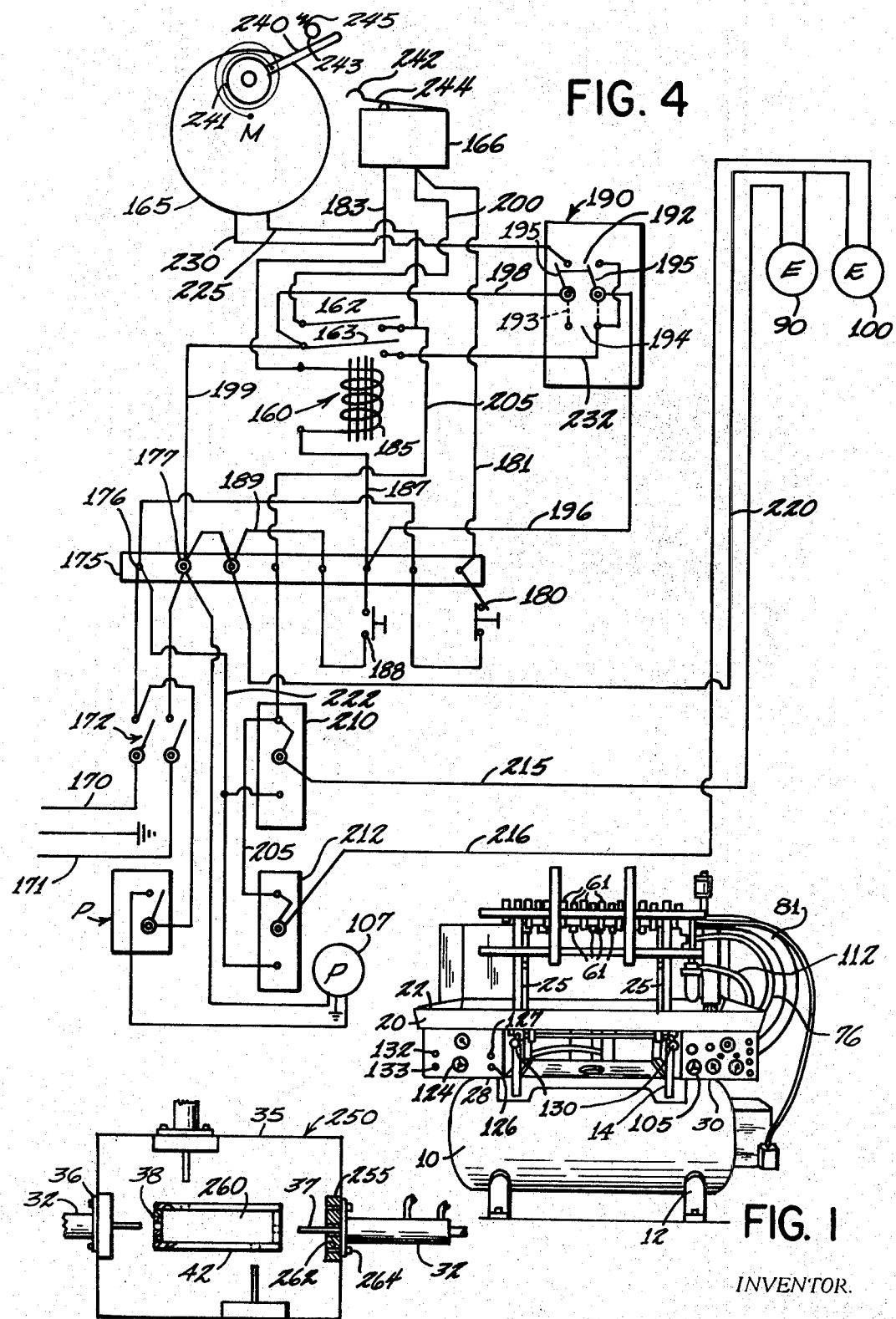

Filed Sept. 20, 1968   2 Sheets-Sheet 2

INVENTOR.
BY J. Thomas Calhoun
Schroeder, Siegfried & Ryan
ATTORNEYS

United States Patent Office 3,545,309
Patented Dec. 8, 1970

3,545,309
MULTIPLE DRILL PRESS
J. Thomas Calhoun, 3305 Shores Blvd.,
Wayzata, Minn. 55391
Filed Sept. 20, 1968, Ser. No. 761,037
Int. Cl. B23b 39/22, 39/16
U.S. Cl. 77—21                                         9 Claims

ABSTRACT OF THE DISCLOSURE

A multiple drilling machine in which a plurality of boring operations may be provided on a work piece simultaneously and from different positions with respect to the work piece and on varying surfaces of the work piece. The work piece is mounted in a jig fixture which also mounts the drill motors with associated feed and reverse actuators as well as coolant supplies for the drill bits and a clamping structure to hold the work piece in the jig fixture. The fluid or air supplies for the drill motors and actuators and the coolant source are provided through manifolds on the drill frame into which air and coolant under pressure is supplied under the control of valves for manual and automatic operation.

---

The present invention relates to a multiple drilling machine and more particularly to an improved apparatus of this type adapted for simultaneous drilling of a plurality of holes into a work piece in a desired pattern arrangement and at various surfaces thereon simultaneously.

Multiple drilling apparatus has previously been employed in a number of industries, for example, the furniture industry for automatic and multiple drilling of work pieces. These prior machines have been exceedingly complex in nature and have had limited application because of the type of material worked with, the size of the work piece, the limit of application of the machine and the range of accuracy of the same. Where such machines are used for metal working, the metal working or drilling takes place on one surface of the work piece only, with such a work piece being generally elongated and the individual drills or boring tools being spaced from one another but adjustable on a common frame. In all such machines, the accuracy requirements are determined by the positioning of the individual working tools relative to a frame and to one another and the accuracy of positioning the work piece on a table or in a work piece holder.

The improved multiple drilling machine of the present invention is directed to a simplified drilling apparatus particularly used for metal working and on small to intermediate sized work pieces which can be placed in a jig fixture and work holding structure with the individual drills or boring tools being positioned in the jig to perform a working function on a plurality of surfaces of the work piece. This improved drilling apparatus requires accuracy in the initial making of the jig or fixture, which accuracy is not disturbed by continuous operation, thereby providing a machine for continuous and automatic operation with retained accuracy. The individual jig fixture may be altered for different sized work pieces and different drilling operations and will provide the positioning of drill guide for the individual drilling tools and the accuracy of locating the same together with a maintained accuracy of mounting or holding of the work piece so that desired drill locations will be maintained in the jig fixture so that the fixture can be used for continuous manufacture of a plurality of such pieces. The improved drilling apparatus provides a source of fluid pressure for operating individual drills and for retracting and feeding the same together with control of the feed and control of a lubricant flow or coolant flow thereto, such that the accuracy will be maintained and the individual working tools will be properly used. Further, the improved drilling apparatus may be operated by any person without the requirements of a high skill for machine operation.

Therefore, it is the principal object of this invention to provide a simplified multiple drilling apparatus, particularly adapted for simultaneous drilling of a plurality of holes in a work piece in a desired pattern arrangement and at varying angles to one another.

Another object of this invention is to provide an improved multiple drill apparatus which is easy to set up and use and will maintain accuracy in drilling for a continuous number of drilling operations.

A further object of this invention is to provide an improved multiple drilling apparatus which permits ready interchangeability of work pieces and permits control of the drilling operation for accuracy and improved maintenance of drilling equipment.

A still further object of this invention is to provide a drilling apparatus of this type which is readily adaptable for manual and automatic control.

These and other objects of this invention will become apparent from a reading of the attached description, together with the drawings wherein:

FIG. 1 is a perspective view of the improved multiple drilling machine;

FIG. 4 is an electric circuit diagram for the improved multiple drilling machine;

FIG. 5 is a plan view of a jig fixture for use on the multiple drilling machine.

Figure 3:
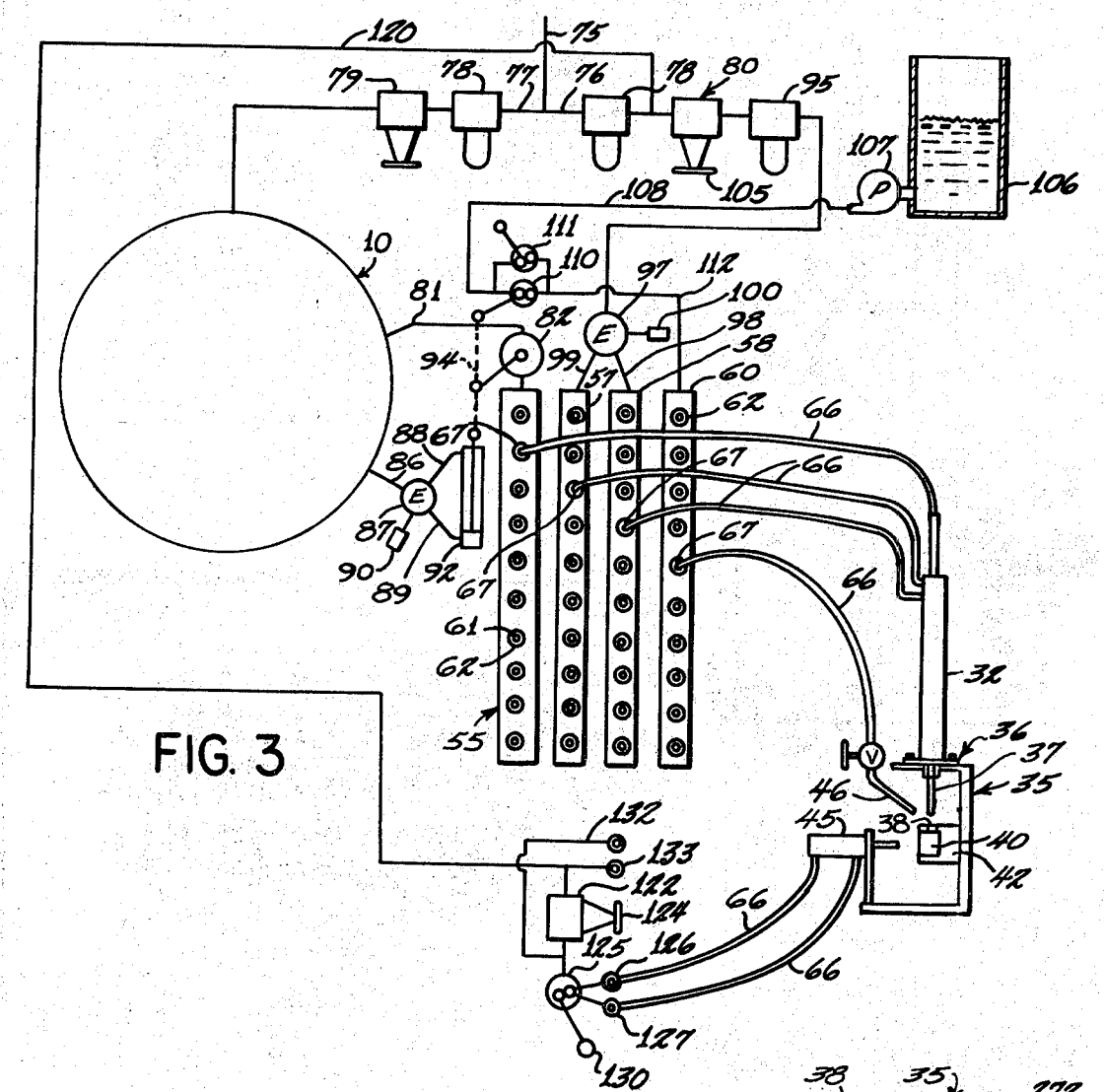
FIG. 3 is a schematic circuit diagram for the fluid circuit of the improved multiple drilling machine.
Figure 2:
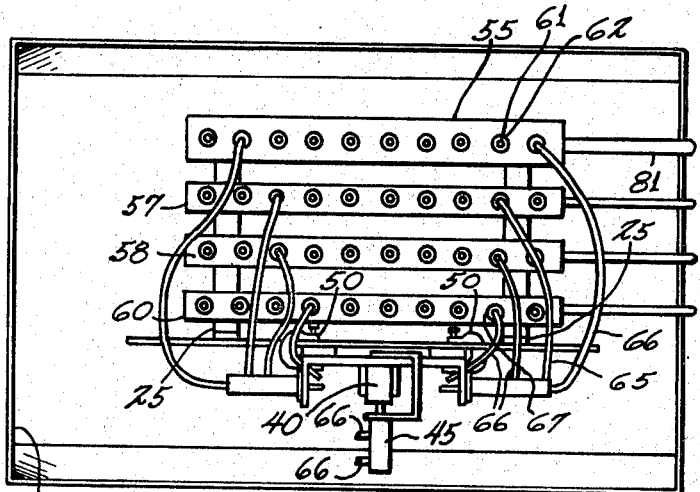
FIG. 2 is a plan view of the improved multiple drilling machine.

My improved multiple drilling machine is shown in FIG. 1 as incorporating a frame which includes generally a surge tank 10 with suitable legs 12 supporting the same and a frame 14 secured to the tank through suitable means, such as welding, to provide a frame for mounting a table portion 20 with flanges or lips 22 around the edges of the same. This frame may take varying forms and may be independent of the surge tank, as desired. Positioned on the table portion of the frame is an upstanding supporting structure 25 which is secured to the table portion through suitable means (not shown) and provides the mounting for the working equipment of the machine, as will be later defined. Attached to the table portion and the frame portion 14 are suitable control panels 28 and 30, respectively, which incorporate the manual and automatic operated switch control, as will be hereinafter defined.

My improved multiple drilling machine provides for the mounting and operation of a plurality of drills which will perform a boring operation on a work piece simultaneously from various angles and on various surfaces of the work piece. As will be hereinafter explained, the individual drill units or drills, indicated generally at 32, each include an air operated drive motor (not shown) and air operated bi-directional linear actuator (not shown) incorporated into the composite drill structure which is mounted on a jig fixture 35 through suitable flanges, such as is indicated at 36, to position the drill units on the jig fixture. Each of the drills has bits 37 which are directed through hardened steel bushings 38 which guide the bits 37 in working relationship with a work piece, schematically shown at 40, mounted on and in a work piece holder 42 attached to the jig structure 35. The bushings 38 are accurately located in the work piece holder for each hole to be drilled in a work piece. To perform the drilling operation with the work piece 40 accurately and rigidly in the work piece holder 42, suitable air operated clamps, such as is indicated at 45, are also mounted on the jig structure 35 and bear against the work piece to hold the same in the work piece holder. In addition, cooling lubricants are directed on the individual drill bits 37 through nozzles 46 positioned on the jig structure so that drill life will be extended and accuracy in boring will be maintained. Such a clamping and lubricating as well as cooling function will be performed substantially simultaneously with the drilling operation in a controlled manner, as set forth hereinafter.

The improved multiple drilling machine permits the mounting of a plurality of drills relative to a work piece and in a jig fixture, and the jig fixture itself attaches to the upright portion 25 of the frame on the table 20. Suitable removable clamps 50 permit the mounting of the jig fixture on the upright portion of the frame without requirement for accuracy, since the individual drills and associated equipment for boring are all mounted on the jig fixture itself. The individual jig fixture provides a jig fixture with the work piece accurately located at a predetermined point therein in the work piece holder 42 and with the individual drill units 32 being mounted on the flanges 36 of the jig fixture relative to the work piece with the drill bits 37 being directed through the accurately located bushings 38 so that the boring will take place in the work piece at exact locations. This permits the multiple drilling machine to be used for any number of boring configurations with any number of boring tools and with the accuracy being dictated by the location of the bushings for the drill units and work piece in the jig fixture. Thus, for each boring job, a separate jig fixture is required which when completed and with the appropriate drills mounted therein, will provide an arrangement for maintained accuracy for a particular drilling job throughout the life of the jig fixture. It permits ready interchangeability for varying jobs by mere substitution of a new jig fixture and positioning of boring tools and associated equipment thereon.

The power source or connection for the individual boring tools including the feed motors and drill motors as well as the cooling, is in the form of a plurality of manifolds 55, 57, 58 and 60 positioned on the upright portion 25 of the frame. As will be seen in the drawing, the manifold 55 is larger in diametrical dimension than the remaining manifolds in as much as it provides the air source for the drill motor and supplies the required air supply for a plurality of drill motors simultaneously. Each of the manifolds has a plurality of apertures 62 therein with suitable seal-type coupling members 61 for sealing the same. Flexible tubing or piping 66, with adapter couplings 67 at the one extremity of the same, permit the connection of the feed motors and drill motors to the respective manifolds. Thus, any number of drill units 32 may be connected to the manifolds through flexible conduits, one of which will connect the drill motor itself to the manifold 55 through a flexible pipe 66 and couplings or connectors 67 with the bi-directional feed actuator for the same being connected through similar flexible conduits or pipes 66 and couplings 67 to the manifolds 57, 58 at the disconnect couplings in the apertures therein. Similarly, the respective coolant valves or nozzles 46 associated with each drill bit for the drill actuators are connected through flexible conduits or pipes 66 and couplings 67 with suitable disconnects at the ends thereof to the manifold 60 at one of the apertures 62 therein.

In the improved multiple drilling machine which utilizes air operated drill units 32, it is necessary to provide different air capacity sources for the drill motor as distinguished from the feed motors. Where a number of drill units are operated, a larger capacity source is required since such units are operated simultaneously and air requirements for the motor portion of the same are substantially increased. Similarly, for energizing the bi-directional actuator for a drill motor in the reverse and forward direction, the manifolds 57 and 58 must be selectively pressurized such that the operation of the feed motor may be reversed with the opposite manifold vented to atmosphere. In addition, the lubricant and coolant supply should be selectively actuated to be operated only when the drill bits are rotating to conserve on the amount of coolant used. The coolant will be directed onto the drill bits and allowed to drop on the table with the lip flange to be collected, filtered, and directed back to the reservoir through pipes, not shown, or otherwise removed.

The schematic diagram of FIG. 3 for the fluid power supply discloses the connections to the manifolds and the respective connections from the manifolds to the air motor and coolant jets as well as the clamp 45. In FIG. 3, the conduit 75 indicates an input line from a fixed or permanent air line source, with this conduit being connected to branch paths 76, 77 leading respectively to filters 78 and pressure regulating valves 79, 80 in these branch paths. The branch path 77, which includes the filter 78 and regulating valve 79, is connected to the surge tank 10 and from the surge tank 10 through a conduit 81 through an on, off valve 82 to the manifold 55. A second branch conduit 86 leading to a vented diverting valve 87 operated from suitable actuator 90 feeds a pair of conduits 88, 89 to a bi-directional actuator 92 which operates the on, off valve 82 through a linkage indicated in phantom at 94. Thus, the surge tank 10, as regulated by the regulator 79, provides a fixed pressure through the on, off valve 82 to the manifold 55 with sufficient air capacity to operate all of the drill motors which can be connected to the manifold at the respective disconnect outlets thereon.

The branch path 76, which includes the filter 78 and regulator 80, also includes a lubricant unit 95 of the conventional type in series therewith for the purpose of introducing lubricant to the air supply. This conduit includes a vented diverting valve 97 operated through a suitable actuator 100 with a pair of outlet passages 98, 99 connected respectively to the manifolds 58, 57. The diverting valve 97, similar to the diverting valve 87, provides a vented passage to vent that conduit which is not connected directly to the inlet air supply. Thus, the manifolds 57, 58 will be selectively connected to the inlet 76, as regulated by the regulator 80, with the opposite or other outlet passage and associated manifold being vented to atmosphere. This will permit the air supply to be directed through one or the other of the flexible conduits or pipes 66 to the feed actuator in the drill unit 32 to advance or reverse the same while the opposite side of the feed actuator will be vented through the respective manifold to atmosphere. The pressure regulating valve 80 is positioned with its operating handle or adjusting handle 105 on one of the control panels 30 at the table or frame of the machine such that the feed rate may be adjusted to adjust the drilling force of the drill units. This permits adjustment of the drilling force or pressure, depending upon the type of material in the work piece. In addition, the multiple drill apparatus includes a coolant source, indicated by the tank 106, having a continuously operated pump 107 associated therewith which pumps the coolant through a conduit 108 to a pair of on, off valves 110, 111 connected in a parallel circuit and and through a conduit 112 to the manifold 60. The on, off valve 110 is connected to the mechanical linkage 94 to be operated by the actuator 92 simultaneously with the valve 82 such that the coolant supply will be opened and flowing during operation of the drill or rotation of the same through energization of the drill motors. The parallel connected valve 111 permits selective and manual operation of the coolant source for filling the manifold 60 and directing fluid thereto to the coolant jets or nozzles 46 for test purposes or for periods of operation other than when these drill motors are operated. The actuators 100 and 90 for the diverting valves 87 and 97 for the air source leading to the feed motor manifolds and the drill motor manifold, are operated from an electrical network shown in FIG. 4. In addition, the air supply line 76 includes a second conduit 120 leading to a regulator 122 whose operating handle 124 is positioned on a control panel 28 with the outlet of the same being connected to a diverting valve 125 having outlet passages 126, 127 leading through flexible conduits or pipes 66 to the bidirectional operator of the clamp 45. A suitable handle 130 for manually operating the valve 125 is provided on the table, but an electromagnetic actuator may be incorporated to provide for simultaneous operation of the clamp with the drill actuator 90. In addition, a set of parallel conduits or pipes 132, 133 provide a regulated and a line pressure test source respectively at the panel 28 for any other desired purpose.

The electrical circuit diagram of FIG. 4 discloses several modes of operation which will provide a means of automatic or manual operation of the electromagnetic actuators 90 and 100 controlling, respectively, the diverting valves 87 and 97 to connect their respective air supplies to the manifolds 57, 58 and 55. This electric circuit may vary in form and utilizes basically a relay 160 with normally open contacts 162, 163, a timer motor 165 and a normally closed switch 166 operated thereby. The inlet energization circuit is evidenced by the conductors 170, 171 which is connected through a disconnect switch 172 to a terminal board 175 at terminals 176, 177. Terminal 16 is connected through a normally closed stop switch 180 and through a conductor 181 to one side of the normally closed timer switch 166. The opposite side of the switch 166 is connected through a conductor 183 to the operating coil 185 of the relay 160 and from a conductor 187 through the normally open start switch 188 and a conductor 189 back to the terminal 177 of the opposite side of the power supply. Thus, with the start switch closed, and the stop switch in the closed position, the relay 160 will be energized, closing its contacts 162, 163. The start switch is a hand operated switch held by an operator. The stop switch, in series circuit therewith, is on the panel 30. Thus, by closing the start switch 188, the machine is operative. Whenever the stop switch is depressed, the machine will stop. Associated with the control panel 30 is a manually operated mode switch 190 having a first set of contacts 192 defined for automatic or timed operation and a second set of contacts 194 for manual operation and a third position for deadman operation in which both contacts 192 and 194 are open. In each mode of operation the start switch is the start control. The automatic or timed length of drilling mode of operation is provided through the timer motor 165 which operates on the normally closed switch 166 to open the same and time the drilling operation after starting. The deadman mode of operation is not under influence of the timer, and whenever the start button is released, the drilling function will be stopped. The manual mode of operation is initiated by the start switch and is terminated by operation of the stop switch without control by the timer. The control contactors 163 and 162 of relay 160, after energization, control respectively the operation of the timer motor and the drill and feed motors through energization of the actuators 90 and 100.

In the deadman mode of operation, a circuit is first established for relay 160 from terminal 176, stop switch 180, conductor 181, normal closed switch 166, conductor 183, coil 185, conductor 187, switch 188, conductors 189 to terminal 177. With relay 160 energized, a circuit for the energization of the contactors or actuators 90, 100 is provided from the line voltage terminal 176, stop switch 180, through the conductor 181 to a conductor 200 leading to one side of the relay contact 162 and from the opposite side of the relay contact 162 through a conductor 205 to one side of the drill and feed test switches 210, 212, respectively. These are manually operated single pole, double throw momentary switches which in one position provide a circuit directly through conductors 215, 216 to the one side of the respective actuators 90 and 100, with the opposite sides of the respective actuators being connected through a return conductor 220 leading to the terminal 177. In the deadman mode of operation, the drill motors are advanced and the drills are rotated as long as the start switch is closed. When the start switch is released, infeed, the drill motors, and the coolant supply will be stopped. This will cause reverse feed of the drill actuators and stop the drill motors. The operator controls the length of the drilling cycle and re-initiation of the drilling cycle after the work piece has been removed and a new one is inserted into the work holder on the jig structure by again closing or depressing the start switch.

The manual mode of operation is established by operating the mode switch 190 to close contacts 194 (which are shown open in FIG. 4). In the closed position, the circuit will be through the phantom line 193. Thereafter, the operation of the start switch 188 will effect energization of the relay 160, as in the deadman mode of operation, to close the contacts 162, 163. Operation of contact 163 to the closed position sets up a hold for the coil 185 around the start switch through a circuit which includes conductor 196, switch contacts 194, conductor 212, contact 163 and conductor 199 to terminal 177. Thus, whenever the start switch 188 is closed to initiate energization of relay, it will remain energized even though the start switch is thereafter opened. The power circuit for the actuators 90, 100 is established through contact 162 of relay 160, as in the deadman mode of operation. In this manual mode of operation, it is necessary to operate the stop switch 180 to de-energize relay 160 before the power circuit to the actuators 90, 100 is opened. Infeed and coolant flow, as well as drill bit rotation, continue until the stop switch is operated, after which reverse feed of the drill actuator takes place with termination of the coolant flow and drill rotation.

In the automatic mode of operation, energization of the timer circuit is effected whenever the switch 190 has its contacts 192 closed for the automatic mode of operation, as shown by the solid lines 195 in FIG. 4. In this circuit condition, the stop and start switches 188 and 180 will be closed, energizing the relay 160 and closing the contacts 162, 163. An energization circuit for the timer motor is provided from the terminal 176, stop switch 180 through the conductor 181 and conductor 200, the relay switch 162 to a conductor 225 leading to the motor 165 with a return conductor 230 being connected through the contact 192 of switch 190 and conductors 198, 199 leading to the opposite side of the source of power at terminal 177. This will energize the motor to cause it to run and an operating arm 240 thereon will engage a deflecting blade 242 on the switch to depress the button 244 thereof opening the normally closed switch 166. This will cause the relay 160 to drop out and contacts 162, 163 to open. The cycle will be initiated again by depression of the start button 188. The latter operation will re-engage or energize the relay, closing the contacts 162, 163 and energizing the timer motor so that a drilling function will be provided for the time period and rotation of the motor until the switch 166 is again activated. In the automatic mode of operation, the operator will control the depression of the start button to allow him to interchange work pieces so that the drilling function will be timed, after which a sufficient period of time will elapse, allowing the feed motor to reverse with no energization on the actuator 100 until the drill bits are clear and the operator has had an opportunity to interchange the drilled work piece with a new work piece in the jig fixture 35. In this mode of operation, the hold circuit around the start contact 188 is established by closure of the relay contact 163 through conductor 232 to one set of the contacts 192 of switch 190, conductor 196 to the start switch 188. This will maintain energization of the relay coil 185, even though the start switch is opened, until normally closed switch 166 is opened by the timer. The timer motor is a synchronous motor with a unidirectional clutch (not shown), coupling its output shaft to the arm 240 to rotate the same. A return spring 241 is connected to the arm to return it to the stop position whenever the motor is de-energized. Stop member 243, against which arm 240 rests in the start position, is adjustable, as at 245, to adjust the timing cycle.

Whenever either or both of the test switches 210, 212 for any of the modes of operation are momentarily positioned in the opposite direction, they are connected in common to a conductor 222 from the terminal 176 such that the conductors 215, 216 will be directly connected to one side of the power supply, with the return line 220 being connected to the opposite side for selective testing of the drill and feed actuators.

Energization of the actuator 90, in addition to operating the valve 82 to apply pressure from the surge tank to the manifold 55, will also operate the valve 110 to provide a flow of coolant from the source 106 to the manifold 60 to lubricate the drill bits during rotation of the drill motors. Simultaneous energization of the actuator 100 will selectively apply air pressure to one or the other of the manifolds 57 or 58 for the infeed direction of motion of the respective drill actuators. The drill units, which include adjustable depth stops, will advance in the drilling operation to stop setting. The drill units are physically positioned in the jig structure relative to the work piece to meet required drill hole spacing. At any time on the infeed stroke of the drill units, and in any of the automatic, manual or deadman types of operation, the operator may engage the stop button to cause reversal of feed direction and cessation of rotation of the drill motor. Normally in automatic operation, the timing motor determines the length of the infeed energization of the actuator 100 and drill operation. After this timing function the cycle is automatically reversed, stopping the drill motor and allowing reverse feed to the manifold which will cause the respective drill actuators to retract or reverse. When the drills are clear of the work piece, the operator may then release the clamp holding the work piece and insert a new one. The pressure will be maintained on the manifold 57 for the reverse feed direction of the actuator until a new drilling sequence of operation is provided. During this period of time, the drill motor and the coolant supply will be de-energized when not operating respectively.

Figure 6:
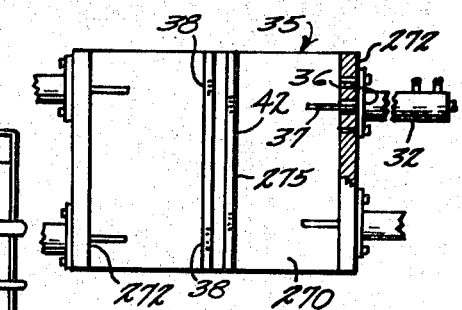
FIG. 6 is a plan view of another jig fixture for use on the multiple drilling machine.

FIGS. 5 and 6 are examples of jig fixtures, shown generally at 35 in FIG. 3, which may be utilized with the improved multiple drill apparatus or machine. In FIG. 5, the jig fixture 35 is comprised of a plate 250 with a plurality of transversely extending flange parts 255 suitably secured thereto and spaced on plates to support drills for alignment, with a work piece holder 260 having guide bushings 38 therein, positioned on the plates and suitably secured thereto. The flange parts have apertures therein, aligned with the bushings 38 in the work piece holder and work pieces thereon, through which the drill bit extends and additional tapped apertures 262 for aligning with bolts 264 in flanges 36 on the drill motor for mounting the same on the flange parts 255. The work piece holder may vary in form and is generally a channel-shaped part into which a work piece is positioned and adapted to be held by the clamp or clamps 45. In FIG. 5, for example, the work piece could be a rectangular part of dimensions such as to fit snugly into the work piece holder, and drilling will take place in the ends and sides thereof. The drills may be offset from the base any distance and at different distances, depending upon drilling requirements and location of the mounting apertures for the drills. In FIG. 5, drill units 32 are shown in part for examples of such mountings.

In FIG. 6, another example of a drill fixture 35 is shown to indicate a variety of mounting and location of parts. The base plate 270 has a pair of end flanges 272 which mount the drill units 32 with the work piece holder 275 with guide bushings 38 therein being located centrally thereon and intermediate the flanges 272. In this version, the work piece will be plate-like in form and a plurality of drills may be mounted on each flange 272. The mounting of the drill units will be the same as in FIG. 5 and the individual drill may be at any angle and in any position relative to the work holder to meet drilling requirements.

Thus, for operation of the improved drilling machine, any number of drill units may be mounted in a drill fixture through suitable apertures therein to be located relative to a work piece such that a drilling function may be made thereon on any surface of the work piece depending upon the position of the drills. The accuracy in drilling is determined by the positioning of bushings in the work piece holder. The drill units will be mounted on the jig fixture with respect to the bushings in the work holder and the work positioned therein and are adjustable to align therewith. Stability of holding the work piece within the holder during a drilling operation is provided by clamp cylinders. The pressure regulating valve 80 has its operating handle on the control panel such that infeed and outfeed pressures on the respective actuators may be controlled to control drilling pressures for varying types of material and drilling times. The large capacity surge tank and the large manifold will provide a sufficient air supply to the drill motors to properly operate the same.

Therefore, in considering this invention, it should be remembered that the present disclosure is illustrative only and the scope of the invention should be determined by the appended claims.

What is claimed is:

1. A multiple drilling machine comprising:
    (a) a frame including a table portion and an upstanding portion positioned thereon;
    (b) a plurality of manifolds mounted on the upstanding portion of the frame and each having a plurality of sealable disconnect couplings positioned therein;
    (c) an inner inlet line with a first and second conduit connected thereto, each having a pressure regulating valve positioned therein;
    (d) a surge tank connected to the first of said conduits with additional conduit means including a valve connecting the surge tank to one of said manifolds on the upstanding portion of the frame;
    (e) further conduit means including a diverting valve connecting the second of said conduits to two of the plurality of manifolds on the upstanding portion of the frame to selectively impress air under pressure from the second of said conduits to one of said two manifolds and to vent the other of said manifolds to atmosphere;
    (f) fixture means including a work holding structure and having a plurality of tool receiving apertures therein mounted on the upstanding portion of the frame;
    (g) a plurality of tools positioned in the apertures of the fixture means and having a plurality of removable and flexible conduits connecting the tools and actuating means therefor to the first, second and third named manifolds on the upstanding portion of the frame to supply air under pressure to the tools to advance and retract the same and rotate the same in a drilling operation; and
    (h) control means for selectively operating said valves to simultaneously energize the plurality of tools for simultaneous drilling operation.

2. The multiple drilling machine of claim 1 in which the work holding structure is centrally located within the fixture means and the plurality of tool receiving apertures are disposed about the fixture means such that when the tools are positioned therein, the tool working function on a work piece within the work holding structure will take place at different angles and on different surfaces of the work piece.

3. The multiple drilling machine of claim 2 and including an air operated clamp energized from one of said first and second conduits and operative to position and hold a work piece within the fixture means.

4. The multiple drilling machine of claim 3 and including a coolant source having a pump and conduit means supplying coolant to the working surface of the tool during a working operation.

5. The multiple drilling machine of claim 4 in which the coolant source and conduit means include a valve connecting the coolant source to a fourth of said manifolds on the upstanding portion of the frame and including additional conduit means removably connected to said manifold and to a plurality of nozzles associated respectively with each of said plurality of tools such that coolant is applied to said plurality of tools during a working operation.

6. The multiple drilling machine of claim 2 in which the pressure regulating valve in the second conduit supplying air under pressure to the diverting valve and selectively to the two of said plurality of manifolds is positioned at the control means to be manually adjustable for varying the feed pressure of the tools.

7. The multiple drilling machine of claim 5 and including a control panel mounted on said frame and including said control means and the pressure regulating valve of the second of said conduits for initiating the operation of the tools and controlling the feed rate thereof.

8. The multiple drilling machine of claim 1 in which the fixture means is removably positioned on the upstanding portion of the frame.

9. The multiple drilling machine of claim 5 in which the control means include an electromagnetic relay and an actuator for operating the valves in the first and second conduit means and the coolant source simultaneously.

References Cited

UNITED STATES PATENTS 3,189,065  6/1965  Cochrane et al. ____ 77—24 XR

FRANCIS S. HUSAR, Primary Examiner

U.S. Cl. X.R.

77—22, 24